Patented Dec. 2, 1930

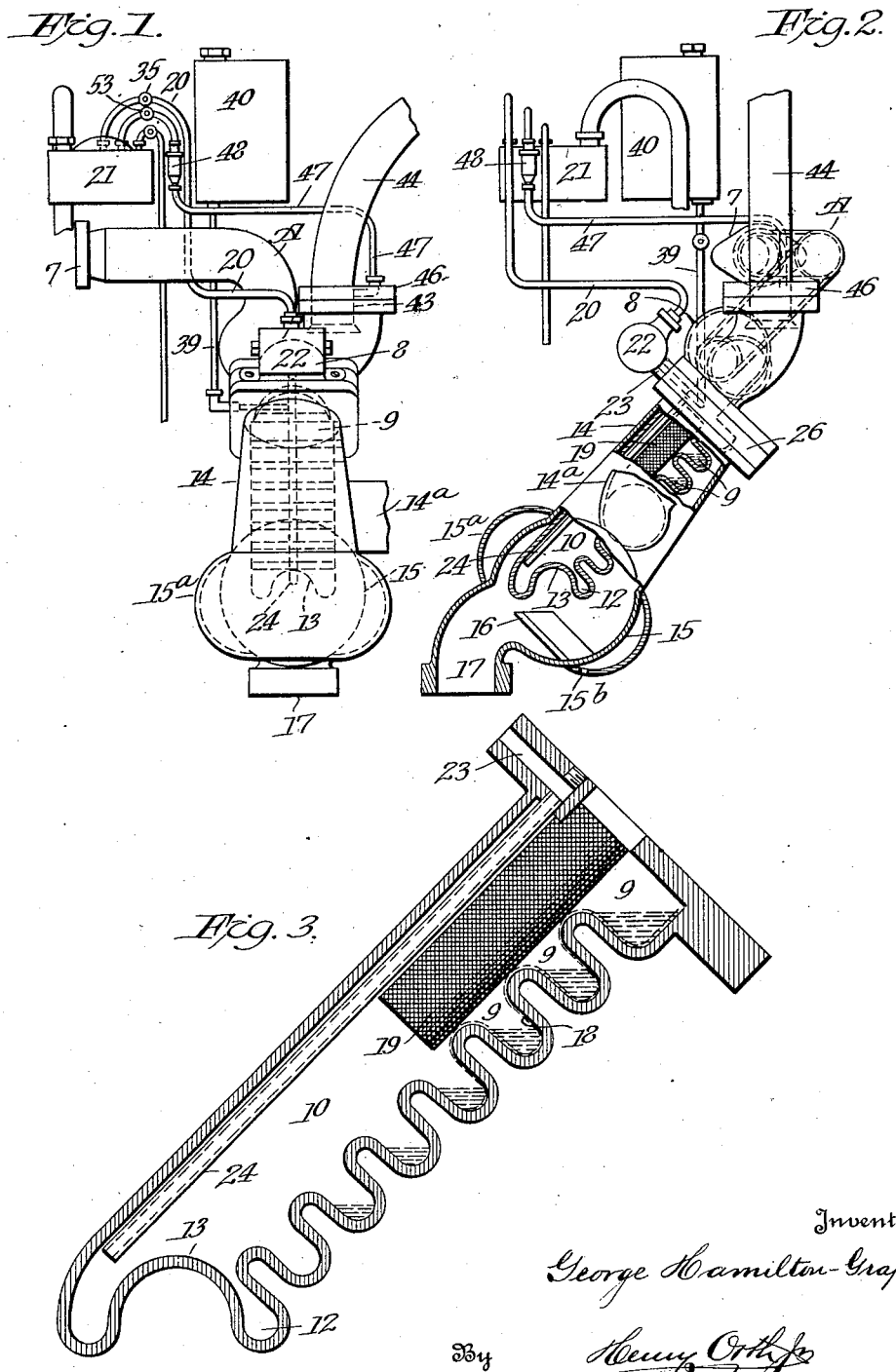

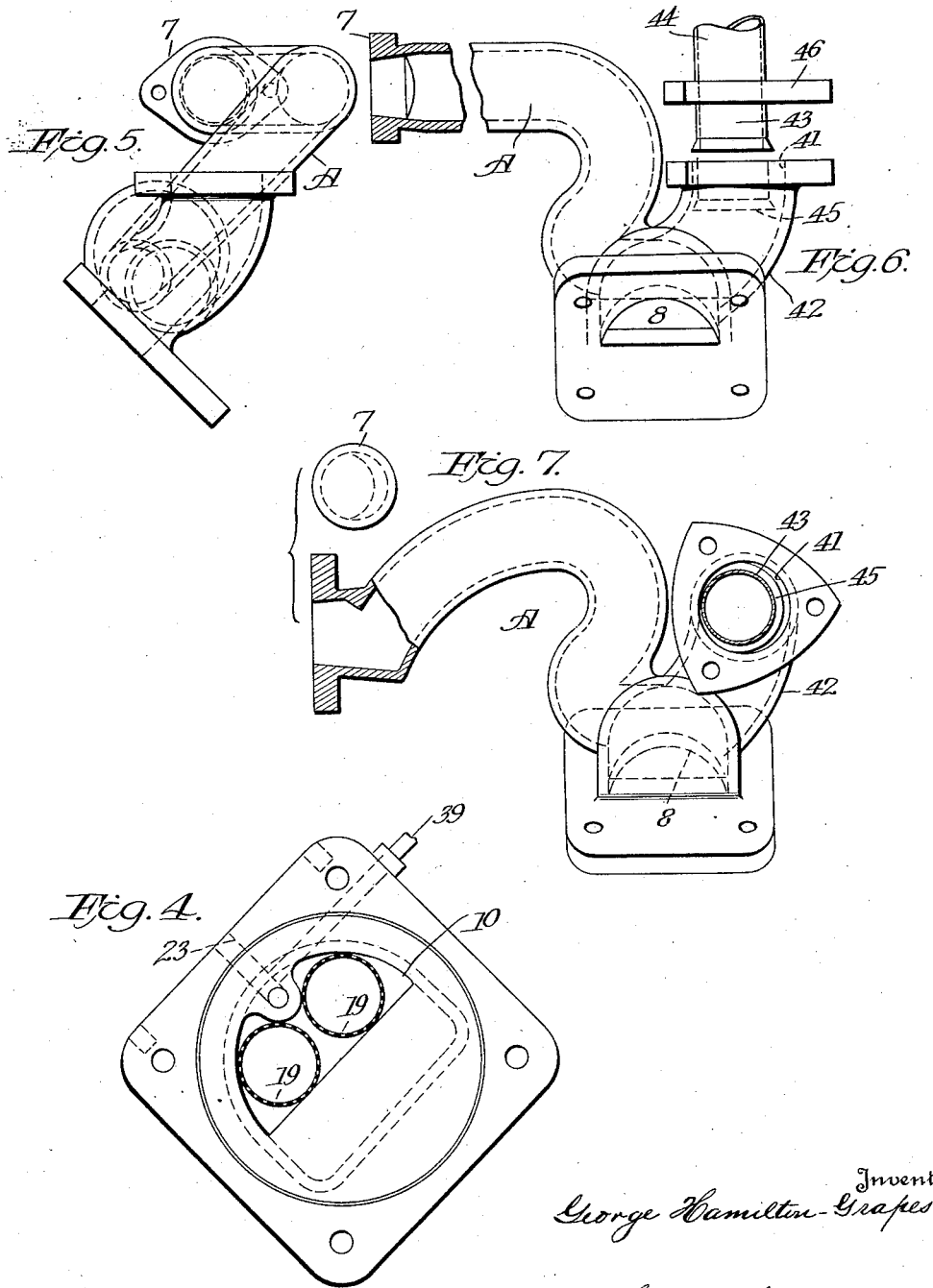

1,783,612

UNITED STATES PATENT OFFICE

GEORGE HAMILTON-GRAPES, OF MURRUMBEENA, AUSTRALIA

CARBURATION OF HYDROCARBON FUEL FOR INTERNAL-COMBUSTION ENGINES

Original application filed March 11, 1926, Serial No. 93,999, and in Australia May 7, 1925. Divided and this application filed September 10, 1928. Serial No. 305,119.

My invention relates to the method of supplying vaporizable fuel to internal combustion engines, and is a division of my United States patent application Serial Number 93,999, filed March 11, 1926.

The method consists in deviating from the main path of carburetted mixture, as by centrifugal action, gravity, or both, or by other means, condensed liquid fuel particles of the heavier fractions; heating the heavier mixed fractions progressively in cascade toward a source of heat from exhaust gases to vaporization in accordance with their vaporization temperature, for return into the main stream of mixture passing to the engine, and supplying to them, preferably at or near the point where they enter the main stream, auxiliary charge constituents.

These auxiliary charge constituents may be alcohol, which acts as a decided anti-detonation addition, or anti-knock, water, steam or water vapor, which increases the rapidity of combustion when decomposed in the cylinder of the internal combustion engine.

Shale oil spirit and other light oils, with vegetable or mineral matter are adapted to assist in breaking down the heavy or decane series of hydrocarbons in fuel.

These charge additions may each be used alone, or any desired mixture thereof may be used, and preferably a light spirit, shale oil spirit, or light hydrocarbon fractions.

The accompanying drawings illustrate the operations.

In these drawings—

Figures 1 and 2 are front and end sectional elevations respectively.

Figure 3 is a longitudinal section of the cascading retort.

Fig. 4 is an end elevation thereof.

Figs. 5, 6 and 7 are, respectively, end and side elevations and plan view of the separator element.

The flanged entry orifice 7 of the separator element A is bolted to any standard type of carbureter. The discharge end of the apparatus is connected by pipe 44 to the engine in-take manifold.

The heavier fuel fractions of the carburetted mixture are deposited on the side walls of the inclined S-shaped separator element A and impelled along said walls by the velocity of the mixture stream to a vortex chamber 8 of approximately semi-spherical form and appreciable cross-section. This chamber is situated at the bottom of the downwardly directed bend of the S-shaped separator element A, and the moist particles are deposited therein by reason of the reduction of velocity, due to increased cross-section in the path of the carburetted stream in the vortex chamber and gravity, assisted by centrifugal force while passing through the downwardly directed bend.

The condensed liquid fuel particles deposited in the vortex chamber 8 discharge into a downwardly directed retort element 10 preferably inclined at an angle of about 45°, more or less, to a vertical plane.

The lower wall of the retort chamber is substantially sinusoidal in longitudinal section, and forms a series of transverse troughs 9 over which the liquid from the vortex chamber 8 cascades to the bottom thereof into a trough 12 of reduced cross-sectional area at the lower end of the series.

The walls of the trough 12 form part of a centrally situated concave or dome-shaped heat trap 13 arranged in a horizontal plane.

The retort 10 is inclosed in a casing 14, which may be cast integral with exhaust manifold 14$^a$. This casing terminates at its lower or exhaust gas delivery end in a globular-shaped expansion chamber or bulb 15 that surrounds the lower end or toe of the retort. Adjacent the toe of the retort in the bulb 15 is a deflector 16, Fig. 2, to cause a maximum amount of expanding exhaust gases, on their way to the discharge pipe 17, to impinge upon the under side of the trough 12 and dome 13 to deliver the major portion of their heat to this trough and dome.

To more fully conserve and extract the heat given off by the exhaust gases especially at low engine speeds, the bulb 15 is insulated, preferably by a layer of air inclosed between the bulb and a shroud or casing 15$^a$ that may be cast integral with the bulb 15 and provided with a single aperture 15$^b$ operating as breather opening.

Other insulating means may be used.

To maintain an even and continuous delivery of liquid from the upper troughs 9 to the lower ones thin strips of wire gauze 18, Fig. 3, are used, which by their capillary action slowly feed the liquid of the upper troughs down into the lower troughs.

In order that the lighter of the heavier condensed liquid fuel fractions centrifugally thrown from the mixture stream in the vortex chamber 8 shall not be subjected to prolonged or excessive heat, but be instantaneously vaporized, one or more tubes 19 of wire gauze are arranged at the mouth of the retort transversely to the upper troughs and longitudinally of the retort 10. These fractions are caught thereon and subjected to a continuous stream of hot air impinging upon both the inner and outer surfaces of these tubes.

For this purpose I provide an air tube 20 from an air filtering chamber 21 through air control valve 22 and a duct 23 and a pipe 24 leading to the proximate end of the retort 10. This air operates to continuously evacuate the retort chamber and provide the required air to form a dry gas mixture with the over rich fuel vapors from the retort.

This air duct 24 also provides air to prevent or reduce the depression existing in a retort of this design and prevents frothing in the retort, especially when starting up the engine, so that condensed liquid fuel particles may not be carried as froth into the main mixture stream.

The air also prevents cracking of the heavy fuel at a later stage of operation when the engine is furnishing its maximum power. This extra air is not, however, required during the initial starting period, especially in cold weather, when the retort forms a trap to retain the heavy fuel fractions and prevents crank case dilution until the engine has warmed up, by running on lower boiling fractions of the gasoline employed.

To automatically and thermostatically furnish the retort with evacuating air when the engine has reached its proper temperature, I use a control valve 22 anchored on the flange 26 of retort 10. This valve connects through an internal air duct 23 in said flange to the pipe 24 leading to the bottom of the retort.

The air duct 23 is also connected to a supply pipe 39 leading from an alcohol or light spirit tank 40, so that the mixture of air and alcohol or other spirit is fully aerated and preheated on its way to the bottom of the retort 10.

The vapors issuing from the retort 10 are intermingled and incorporated in the main gas stream in the vortex chamber 8, and issue therefrom upwardly on their way to the engine at reduced velocity, into a curved chamber or exit mouth 41 of the separator element A having a cross-sectional area greater than that of the inlet or wet-mixture end of the separator element A leading to the vortex chamber 8.

The upwardly turned and enlarged end 42 of the separator element A forms a trap to retain any condensed liquid fuel particles that may remain in the fuel mixture, especially when starting, running slow or idling of the engine.

Projecting into the exit mouth of the chamber 42 is a double lipped extension 43 of the mixing and intercooling element 44. The extension 43 is placed excentrically in the exit mouth. The outer drip lip 45 deflects downwardly any condensed liquid fuel particles that may be deposited on its walls at low engine speed.

On the flange 46 of chamber 44 that registers with the flange of the chamber 42 is arranged a pipe 47 for the supply of extra air from chamber 21.

The carburetted mixture enters the S-shaped member A at 7, makes a turn and enters the vortex chamber 8 of enlarged section. Liquid adhering to the walls of the entering portion of member, separated in part from the mixture by centrifugal action, is swept along by the speed of the mixture stream to the vortex chamber, where the enlarged section of this chamber reduces the velocity by expansion of the mixture and the liquid passes by gravity to the retort chamber 10 cascading toward the bottom thereof in contact with a counter current of air, or air and spirit vapor from the end of pipe 44. The heavy fuel fractions are progressively heated as they flow toward the bottom of the retort. Those portions reaching the bottom are heated indirectly by the exhaust gases vaporized and swept out of the retort into the main mixture stream.

I claim—

1. The method of treating a stream of carburetted fuel mixture, which comprises separating condensed liquid fuel particles from such stream and passing them through a variable temperature gradient and admitting air to the liquid proximate the point of highest heating, and returning the vaporized products into said stream.

2. The method of treating a stream of carburetted fuel mixture, which comprises separating condensed liquid fuel particles from such stream and cascading them through a temperature gradient against a current of air and returning the vaporized mixture into said stream.

3. The method of treating a stream of carburetted fuel mixtures, which comprises separating condensed liquid fuel particles from such stream, passing the particles through an increasing temperature gradient against a current of air, returning the vaporized particles into said stream at the point of separation thereof, and supplying to the particles another charge ingredient.

4. The method of treating a stream of carburetted fuel mixture, which comprises separating condensed liquid fuel particles from such stream, passing the particles through an increasing temperature gradient dependent upon the temperature of the combustion products of such stream, and against a current of air, returning the vaporized condensed liquid fuel particles into said stream at the point of their separation, and supplying at such point a light spirit.

5. The method of treating a stream of carburetted fuel mixture, which comprises separating condensed liquid fuel particles from such mixture by gravity and centrifugal action, cascading the particles through a progressively increasing temperature gradient against a current of air supplied at the point of highest temperature and returning the vaporized particles into said stream at the point of their separation therefrom.

6. The method of treating a stream of carburetted fuel mixture, which comprises separating condensed liquid fuel particles from such mixture by gravity and centrifugal action, cascading the particles through a progressively increasing temperature gradient against a current of air supplied at the point of highest temperature, returning the vaporized particles into said stream at the point of their separation therefrom and supplying alcohol to said point, a part of which is at once vaporized and mixes with the stream, and the remaining liquid mixes with the particles.

7. The method of treating a stream of carburetted fuel mixture, which comprises separating condensed liquid fuel particles from such mixture by the combined action of centrifugal force and gravity and reduction of pressure at a point in the stream, cascading the particles through an increasing temperature gradient against a current of air, returning the vaporized moist particles to the stream at the point of their separation therefrom and supplying at such point a mixture of alcohol and water for dilution of the said particles and to increase their limpidity under formation of steam during their passage through said gradient, said gradient being dependent upon the temperature of the products of combustion of said stream.

In testimony that I claim the foregoing as my invention, I have signed my name hereto.

GEORGE HAMILTON-GRAPES.